Apr. 17, 1923.

P. FORKARDT

CENTERING DEVICE

Filed May 31, 1921

1,452,034

Witnesses:
Helene Hinz.
Walter Schulze.

Inventor:
Paul Forkardt
By Dr. Kilischauer
Attorney.

Patented Apr. 17, 1923.

1,452,034

UNITED STATES PATENT OFFICE.

PAUL FORKARDT, OF DUSSELDORF-OBERKASSEL, GERMANY.

CENTERING DEVICE.

Application filed May 31, 1921. Serial No. 473,720½.

*To all whom it may concern:*

Be it known that I, PAUL FORKARDT, a citizen of Germany, and resident of 70 Lueg-Allee, Dusseldorf-Oberkassel, Province of Rhenish Prussia, Germany, have invented a new and useful Improvement in Centering Devices (for which I have filed an application in Germany August 9, 1918), of which the following is a full and exact description, reference being had to the accompanying drawings, which form a part thereof.

My invention refers to centering devices and more especially to a device of the kind aforesaid provided with jaws in the form of toothed blocks and arranged concentrically around a toothed wheel.

According to the present invention these toothed blocks are in gear with radially movable jaws, the toothed blocks being arranged tangentially with respect to the toothed wheel or pinion each of said blocks being provided with a second set of teeth on their inner faces to gear with said pinion, the number of teeth of the pinion being preferably divisible by the number of pairs of toothed blocks.

Figure 2:
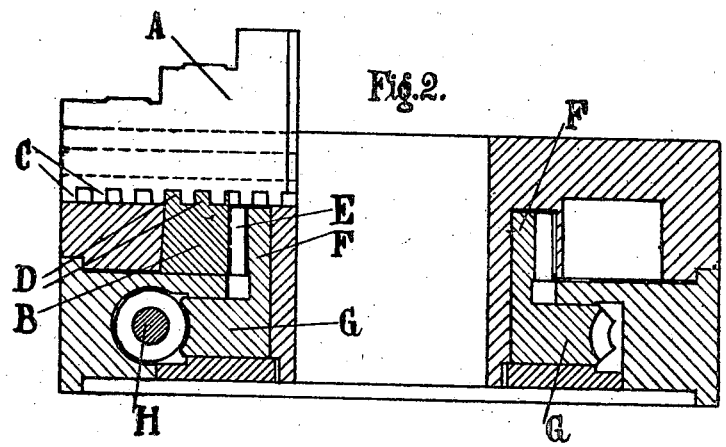
Figure 1:
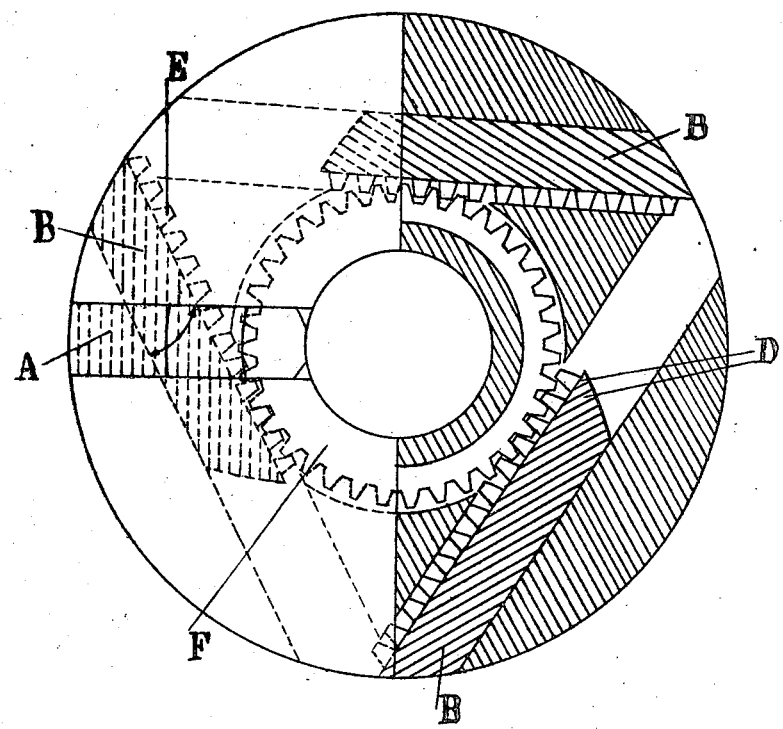

In the drawings affixed to this specification and forming part thereof a self-centering three-jaw chuck embodying my invention is illustrated, Fig. 1 being a front elevation partly in section and Fig. 2 an axial cross section of the device.

Referring to the drawings the jaws A, which are arranged concentrically in respect to the centre of the chuck and are radially movable, are provided at the rear with teeth C. With the latter are geared the toothed blocks B, arranged transversely to the jaws and with their teeth D arranged at an angle to the direction of forward movement, in such a manner that, simultaneously with the movement of the toothed blocks B, the position of the jaws A is altered in the proportion corresponding to the inclination of the teeth. The blocks B are arranged tangentially to the toothed wheel or pinion F disposed concentrically with the centre of the chuck. They are provided on their inner faces with a second set of teeth E, which gear with the teeth of the pinion F. The pinion F is connected rigidly to the worm wheel G, which acts in conjunction with the worm H. If the pinion F is revolved by means of the worm and worm wheel the three toothed blocks B are simultaneously moved correspondingly in the tangential direction. Through the engagement of the toothed blocks with the jaws A the latter are together moved to exactly the same degree towards the center of the chuck or away from it.

The number of teeth of the toothed wheel F is preferably divisible by the number of the pairs of toothed blocks A, B, which ensures that at all the points of contact of corresponding portions of the teeth are in gear. Furthermore it is advantageous to have the teeth C of all three jaws A as well as the teeth D on the one side and the teeth E on the other side of all three toothed blocks B cut in one set, so that any deviations of the flanks of the teeth from their theoretically predetermined form will be found to occur at the same position in all the toothed blocks. A perfectly even and uniform movement of all the jaws is thus secured.

I wish it to be understood that I do not desire to be limited to the exact details of construction shown and described, for obvious modifications will occur to a person skilled in the art.

I claim:—

1. In a chuck comprising in combination, a plurality of pairs of crossed racks, the racks of each pair being in gear with one another, means for simultaneously moving one rack of each pair tangentially to a circle lying in the face of the chuck and means for guiding the other racks radially.

2. In a chuck comprising in combination, a plurality of radially guided racks, a rack guided tangentially to a circle lying in the face of the chuck associated with each radially guided rack, operative connections between said radially and said tangentially guided racks, whereby a tangential movement of the latter rack causes a radial movement of the former rack, and means for simultaneously moving said tangentially guided racks.

3. In a chuck comprising in combination, a disc, a pinion centrally disposed on said disc, tangential and radial guide slots in said disc, racks in said tangential slots the teeth of said racks being in gear with teeth on said pinion, said racks having diagonally extending teeth disposed on their free face adjoining the face having the pinion engaging teeth, chuck jaws in said radial slots having tangential teeth on their bottom face meshing with the diagonal teeth on said racks and means for rotating said pinion.

PAUL FORKARDT.